(12) United States Patent
Williams et al.

(10) Patent No.: US 9,736,975 B2
(45) Date of Patent: Aug. 22, 2017

(54) PIVOTING HOSE SUPPORT SYSTEM FOR AGRICULTURAL IMPLEMENTS

(71) Applicant: CNH Canada, Ltd., Saskatoon (CA)

(72) Inventors: Andrew J. Williams, Saskatoon (CA); Corey N. Marciniuk, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 614 days.

(21) Appl. No.: 13/712,516

(22) Filed: Dec. 12, 2012

(65) Prior Publication Data
US 2014/0158836 A1  Jun. 12, 2014

(51) Int. Cl.
*F16L 3/08* (2006.01)
*A01B 59/00* (2006.01)
*A62C 13/76* (2006.01)
*A62C 37/50* (2006.01)
*B05B 15/06* (2006.01)

(52) U.S. Cl.
CPC .................................. *A01B 59/002* (2013.01)

(58) Field of Classification Search
CPC ....... A01B 59/002; A01B 63/114; B60D 1/62; F16B 35/06
USPC .......... 248/75, 81, 49, 89, 70; 403/164, 165, 403/116, 117; 411/409, 400, 349; 280/515; 16/386
See application file for complete search history.

(56) References Cited

U.S. PATENT DOCUMENTS

| 2,660,444 | A | * | 11/1953 | Cade | B60D 1/02 278/96 |
|---|---|---|---|---|---|
| 2,879,020 | A | | 3/1959 | Wheeler | |
| 2,898,797 | A | * | 8/1959 | Bronstein | F16B 21/165 411/348 |
| 3,190,677 | A | * | 6/1965 | Robbins | B60D 1/02 280/515 |
| 3,279,822 | A | | 10/1966 | Orendorff | |
| 3,901,270 | A | | 8/1975 | Smith | |
| 4,193,611 | A | * | 3/1980 | Fisk | B60D 1/07 280/416.1 |
| 4,483,550 | A | * | 11/1984 | Dubbe | B60D 1/025 280/515 |
| 4,666,177 | A | * | 5/1987 | Vinchattle | B60D 1/363 280/477 |
| 4,783,094 | A | * | 11/1988 | Sands | B60D 1/28 172/677 |

(Continued)

FOREIGN PATENT DOCUMENTS

AU          663463          10/1995

OTHER PUBLICATIONS

Photos of an Early Riser 1250 planter from Case IH, which is believed to be prior art.

*Primary Examiner* — Jonathan Liu
*Assistant Examiner* — Muhammad Ijaz
(74) *Attorney, Agent, or Firm* — Rebecca L. Henkel

(57) ABSTRACT

A pivoting hose support system for use with an agricultural implement is provided that includes a guide through which a hose(s) extends and that is arranged to pivot at an articulation point defined at connections between components that are movable through relatively large ranges of motion with respect to each other. The guide and the movable component may pivot about a common rotational axis and may be arranged upon different portions of a common pivot pin to which the guide may be axially fixed.

10 Claims, 6 Drawing Sheets

(56) References Cited

U.S. PATENT DOCUMENTS

| | | | |
|---|---|---|---|
| 5,082,217 A | | 1/1992 | Parker et al. |
| 5,286,130 A | * | 2/1994 | Mueller .................... B66C 1/66 |
| | | | 294/215 |
| 5,593,264 A | * | 1/1997 | Schlegel ............... A01B 59/002 |
| | | | 411/344 |
| 5,816,732 A | * | 10/1998 | Nissen .................... F16G 11/00 |
| | | | 403/155 |
| 5,908,201 A | * | 6/1999 | Van Vleet ................ B60D 1/06 |
| | | | 280/416.1 |
| 5,979,840 A | | 11/1999 | Hollister et al. |
| 6,206,395 B1 | * | 3/2001 | Young .................... B62K 21/16 |
| | | | 280/278 |
| 6,378,279 B1 | | 4/2002 | Smith et al. |
| 6,932,004 B2 | | 8/2005 | Raducha |
| 7,269,868 B1 | * | 9/2007 | Allin ........................ B25D 1/00 |
| | | | 7/143 |
| 7,393,168 B2 | * | 7/2008 | Wei ........................ F16B 21/02 |
| | | | 411/21 |
| 7,490,799 B2 | | 2/2009 | Young et al. |
| 7,540,133 B2 | | 6/2009 | Zacharias et al. |
| 7,926,386 B1 | * | 4/2011 | Godfrey ................ B62K 21/16 |
| | | | 74/551.3 |
| 7,967,323 B2 | * | 6/2011 | Baum ...................... B60D 1/60 |
| | | | 280/507 |
| 8,052,098 B1 | | 11/2011 | Kowaleski |
| 2001/0028021 A1 | | 10/2001 | Martin |
| 2004/0031888 A1 | * | 2/2004 | Bennett ................ F16L 3/2235 |
| | | | 248/89 |
| 2010/0207360 A1 | * | 8/2010 | Columbia ................ B60D 1/02 |
| | | | 280/504 |
| 2011/0203904 A1 | * | 8/2011 | Kuiper .................... B65G 45/16 |
| | | | 198/499 |

\* cited by examiner

PIVOTING HOSE SUPPORT SYSTEM FOR AGRICULTURAL IMPLEMENTS

FIELD OF THE INVENTION

The present invention relates generally to hose supports, and more particularly, to hose supports for use with articulating components of agricultural implements.

BACKGROUND OF THE INVENTION

Modern agricultural implements can be complex and include numerous hydraulically controlled, pneumatically controlled, and electronically controlled features. Hydraulic and pneumatic hoses and electrical wires are mounted to the implements for controlling these features. Routing and management of the hoses and wires can be difficult, especially for large implements and implements that have articulating components along which the hoses and wires must be routed. Static fixtures such as various clamps have been used to attach hoses and wires to articulating components by rigidly securing the hoses and wires on opposing sides of points of articulation of the articulating components. Multiple fixtures such as pivoting brackets that are held by the weight of hoses at points of articulation such as hitch joints and also large movable brackets have been used to hold the hoses and wires away from the points of articulation, when there is a lot of open space around the points of articulation.

SUMMARY OF THE INVENTION

The present invention is directed to a system for supporting hoses, which may include hydraulic hoses, pneumatic hoses, and wires, while controlling direction(s) of movement of the hoses and control position(s) of the hoses directly at articulation points defined at connections between components that are movable through large ranges of motion with respect to each other in highly confined areas. The system may include a guide through which the hoses are routed and which may pivot about a common pivot axis of hinge mounted components and to which the guide may be axially fixed.

According to an aspect of the invention, pivoting hose support system is provided for use with an agricultural implement. The system may include a pivot pin defining a longitudinal axis and a first portion for supporting an arm of an agricultural implement for pivoting about the longitudinal axis of the pivot pin. The pivot pin may have a second portion that may support a guide which, in turn, supports a hose(s) upon the agricultural implement. The guide may engage the second portion of the pivot pin in a manner that allows the guide to pivot about the longitudinal axis of the pivot pin independently of the arm of the agricultural implement. The guide may support the hose upon the agricultural implement so as to allow the hose to flex transversely with respect to the longitudinal axis of the pivot pin and be restrained against movement in an axial direction relative to the longitudinal axis of the pivot pin. This may allow the hoses to bend with points of inflection or apices that aligned with the articulation points of jointed components while maintaining bending portions of the hoses substantially at the articulation points of jointed components. In this way, direction of movement and position of the hoses may be controlled, even in the highly confined areas of agricultural implements.

In accordance with another aspect of the invention, the guide may include a loop defining an opening therethrough and through which the hose extends. The loop may have first and second segments defining a periphery about the opening so as to define a substantially closed boundary about the hoses. The cross-sectional area of the opening of the loop may be substantially larger, for example, at least about two times larger, than the cross-sectional area of the hoses, allowing the hoses to be relatively loosely confined within the loop. This may allow the hoses to gradually bend while being maintained substantially at the articulation points.

In accordance with another aspect of the invention, a retainer may be arranged with respect to the pivot pin and the guide for maintaining an axial position of the guide relative to the longitudinal axis of the pivot pin. The retainer may include a projection extending from the pivot pin and engages the guide, wherein the guide rotates with respect to the projection. The retainer may be defined by a retainer pin that extends transversely through the pivot pin. The retainer pin may have opposing ends projecting radially from opposing sides of the pivot pin, the ends of the retainer pin engaging the guide for restraining movement of the guide in an axial direction with respect to the pivot pin. This may allow for maintaining the guide in an axial position upon the pivot pin so as to prevent removal of the guide from the pivot pin when bending the hose to a large extent, for example at least about 90 degrees, which may otherwise cause the bent segment of the hose to curl upwardly and lift the guide upwardly against the guide and away from the pivot pin.

In accordance with another aspect of the invention, the guide may include a guide collar having a circumferential sidewall defining a pair of slots extending therethrough and wherein the ends of the retainer pin are arranged within the pair of slots of the guide collar. The circumferential sidewall of the guide collar may define a pair of stops between the pair of slots. The slots may define lengths thereof allowing rotation of the guide collar through a range of motion of at least about 90 degrees or at least about 180 degrees.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION

Figure 1:
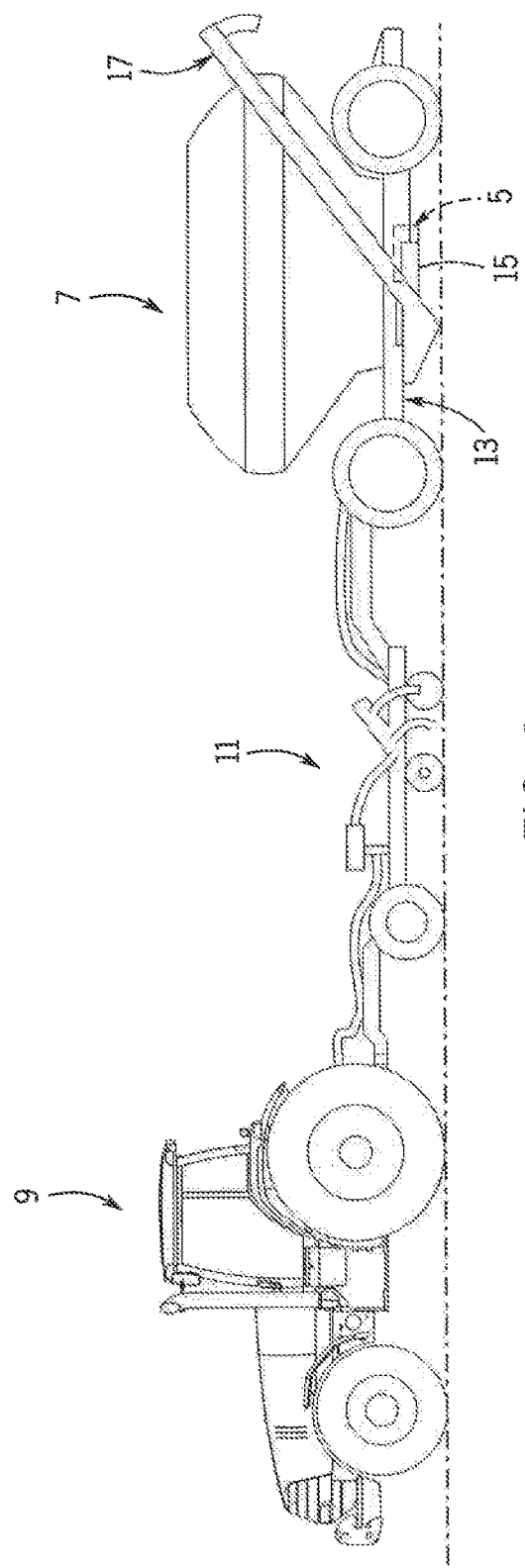
FIG. 1 is a simplified schematic representation of a side elevation of an agricultural implement having a pivoting hose support system according to the invention.

Referring to FIG. 1, a pivoting hose support system for use articulating components of an agricultural implement is generally designated by the reference numeral 5. The agricultural implement is shown as an air cart 7 that is towed behind a tractor 9 and behind which an air drill 11 is towed for delivering product that is stored in the air cart 7 to an agricultural field. The air cart 7 may be a PRECISION™ series or an ADX series air cart available from Case IH and the air drill may be an ATX series air hoe drill available from Case IH.

Figure 2:
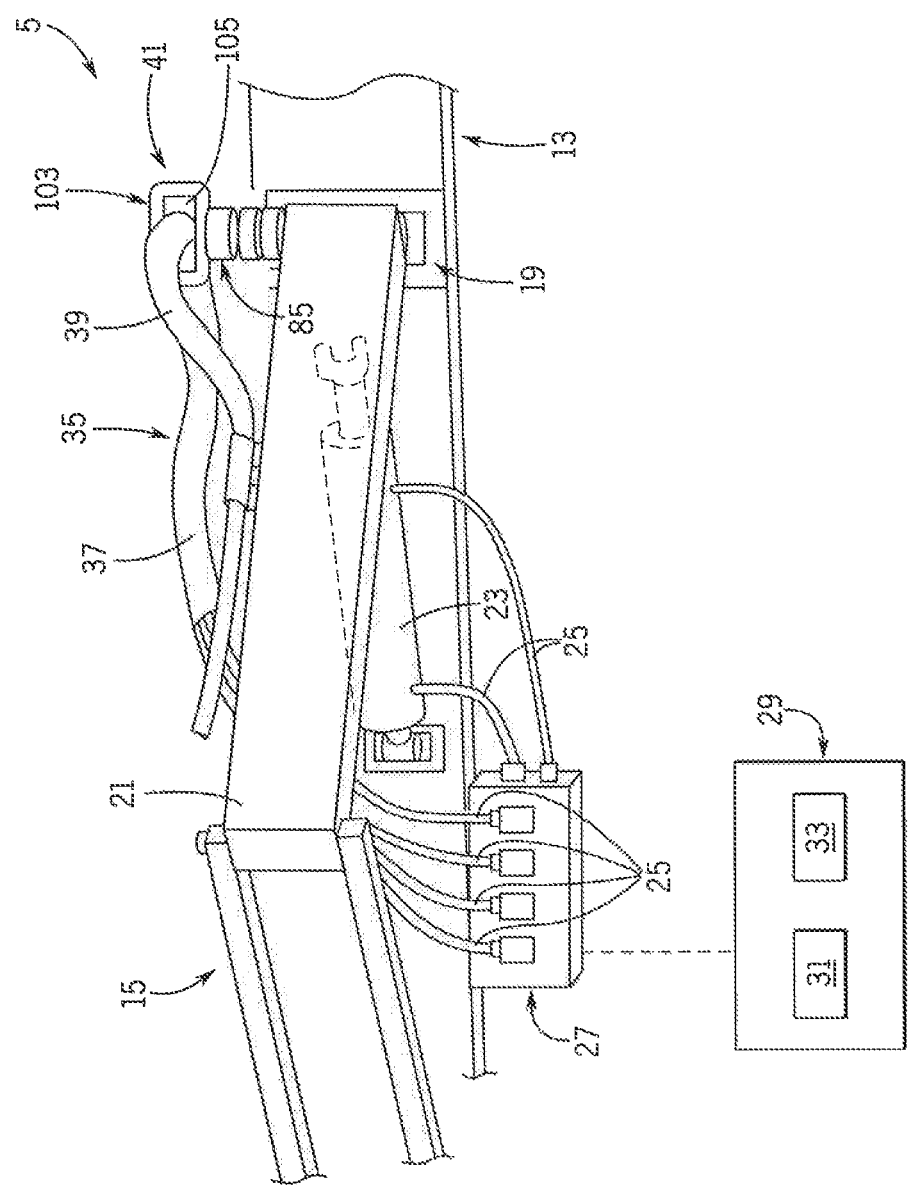
FIG. 2 is a simplified isometric view of a portion of the implement having the pivoting hose support system of FIG. 1.

Still referring to FIG. 1, the system 5 is arranged at a point of articulation between a chassis 13 of the air cart 7 and an arm 15 that supports an auger 17 from the chassis 13. As shown in FIG. 2, the arm 15 includes multiple arm segments that can articulate with respect to each other so as to allow the auger 17 (FIG. 1) to be supported by end of move with respect to the chassis 13 of the air cart 7 for loading and unloading the air cart 7. The system 5 is arranged at a point of articulation defined by a hinge joint 19 between an inner arm segment 21 of the arm 15 and the chassis 13. The hinge joint 19 defines a substantial range of motion of the arm segment 21 with respect to the chassis 13, allowing the arm segment 21 to rotate at least about 90°, for example about 130°, and optionally about 180° around the hinge joint 19 as moved by an actuator 23 that is shown as a hydraulic ram. Hoses 25 connect the actuator 23 to a distribution block 27. Although the hoses 25 in this embodiment are shown as being hydraulic hoses, in some embodiments, the hoses 25 may be pneumatic hoses or electrical conducting wires. The distribution block 27 is operably connected to a control system 29 that includes a controller 31 and power supply 33, as is known, for controlling the distribution block 27 and movement of arm 15 and thus also the auger 17 (FIG. 1). The controller 31 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the air cart 7.

Referring to FIG. 2, the hoses 25 are bundled together as a loom 35 that has a first segment shown as an inner segment 37 that is arranged closest to the distribution block 27 and may be generally fixed with respect to the chassis 13. A second segment of the loom 35 is shown as an outer segment 39 extending along the arm segment 21 and therefore being movable with respect to the chassis 13. The loom 35 extends through the system 5 so that the inner and outer segments 37, 39 are on opposing sides of the system 5 such that flexing of the loom 35 is restricted to occur substantially at the hinge joint 19. The system 5 includes a guide 41 that controls direction(s) of movement and position(s) of the loom 35 with respect to the hinge joint 19 while pivoting to accommodate flexing of the loom 35 without requiring the loom 35 to be dragged across the guide 41 while flexing. This also allows the loom 35 to bend with points of inflection or apices of the flexed loom 35 that align with the articulation points of a jointed component, shown as the hinge joint 19 defined between the chassis 13 and arm 15.

Figure 3:
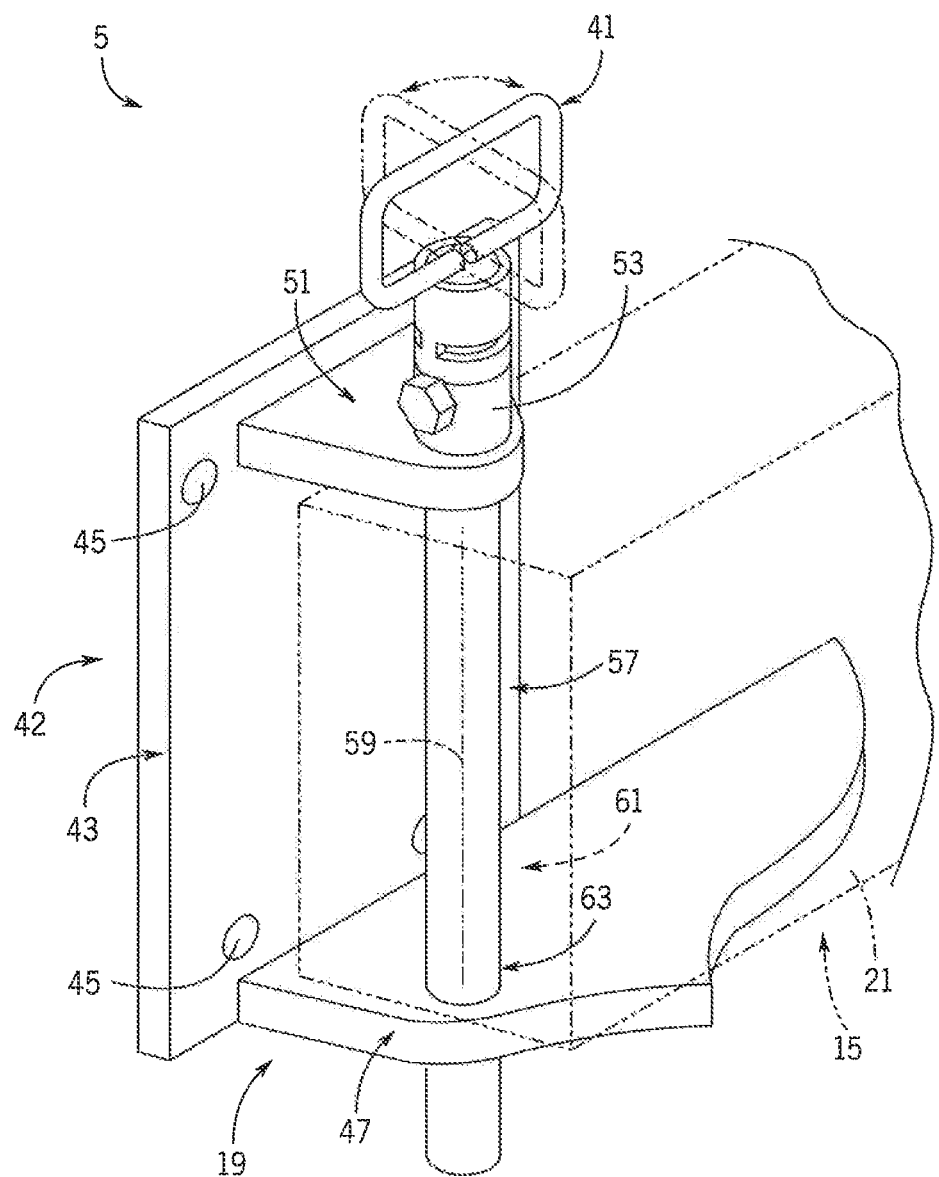
FIG. 3 is an isometric view of a hinge joint of the pivoting hose support system of FIG. 1.
Figure 4:
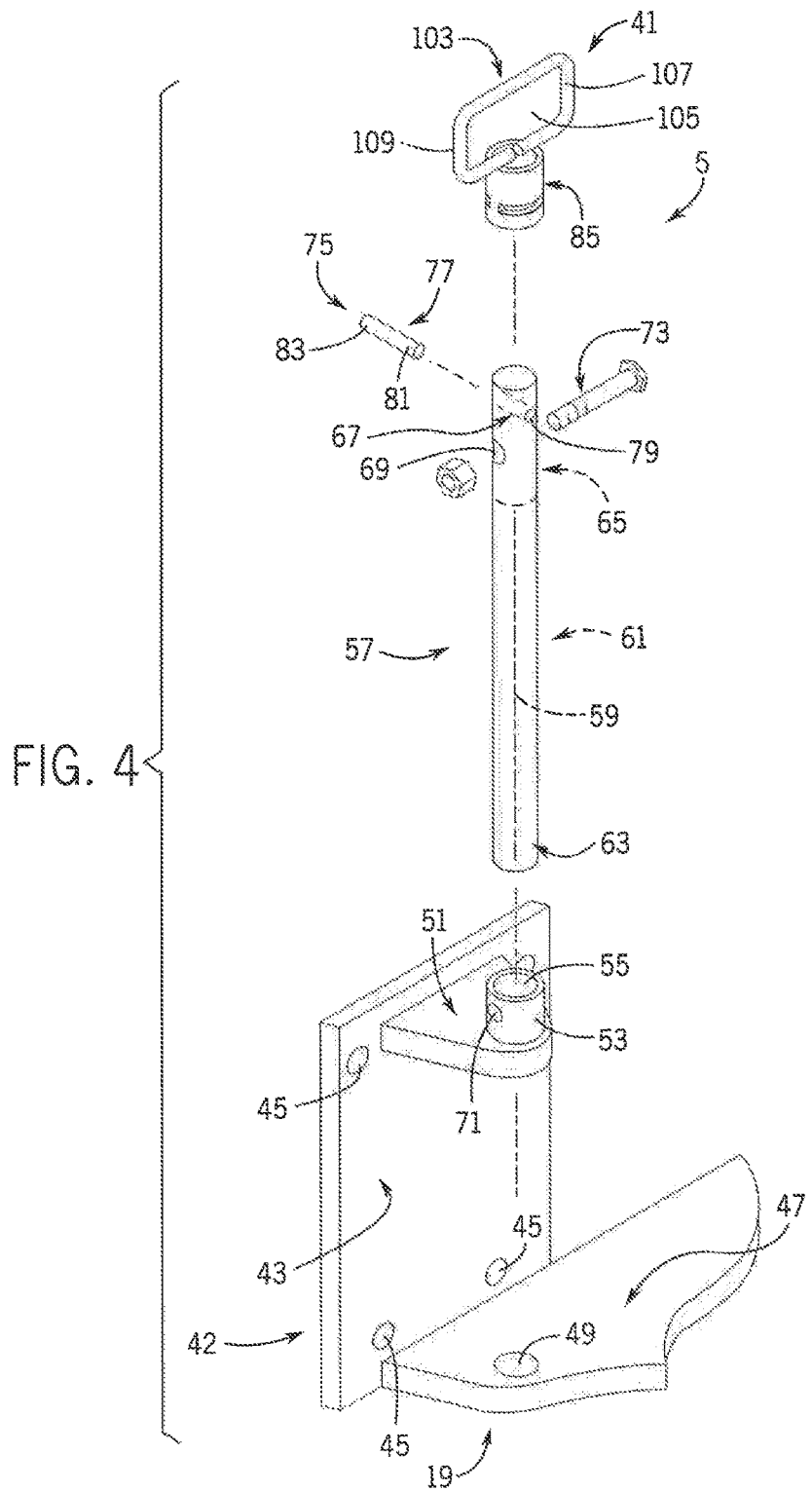
FIG. 4 is an exploded isometric view of the hinge joint of FIG. 3.

Referring now to FIGS. 3 and 4, the hinge joint 19 of system 5 includes a bracket 42 that includes a back plate 43 having bores 45 for receiving fasteners to connect the hinge joint 19 to the chassis 13 (FIG. 2). A lower plate 47 extends perpendicularly from a lower portion of the back plate 43. A bore 49 (FIG. 4) extends through the lower plate 47, in front of and spaced from the back plate 43. An upper plate 51 extends perpendicularly from an upper portion of the back plate 43. A bracket collar 53 extends from the upper plate 51, shown as extending from an upper surface of the upper plate 51, and defines a bore 55 (FIG. 4) that aligns with the bore 49 of the lower plate 47.

Referring still to FIGS. 3 and 4, a hinge pin 57 defines a longitudinal axis 59 and extends through the bores 55, 49 of the upper and lower plates 51, 47 of the bracket 42. The hinge pin 57 includes a first portion 61 that supports the arm 15 and at which a first end 63 of the hinge pin 57 is defined. The hinge pin 57 includes a second portion 65 that supports the guide 41 and at which a second end 67 of the hinge pin 57 is defined. In this embodiment, the first and second portions 61, 65 are shown as being integral with each other, although it is understood that they may be separate from each other in other embodiments. A bore 69 extends radially through the second end 67 of the hinge pin 57. Bore 69 aligns with a bore 71 that extends radially through a circumferential sidewall of the bracket collar 53. A fastener 73, shown as a bolt having a corresponding nut, extends through the bores 69, 71 so as to fix the hinge pin 57 within the bracket 42 with the second end 67 extending upwardly beyond the bracket collar 53 and the first end 63 being concentrically held in the bore 49 of the lower plate 47. A retainer pin 77 secures the guide 41 to the second portion 65 of the hinge pin 57, while allowing the guide 41 to pivot with respect to the longitudinal axis 59 of the hinge pin 57 and restraining the guide 41 against movement in an axial direction along the longitudinal axis 59 and away from the hinge pin 57.

Figure 5:
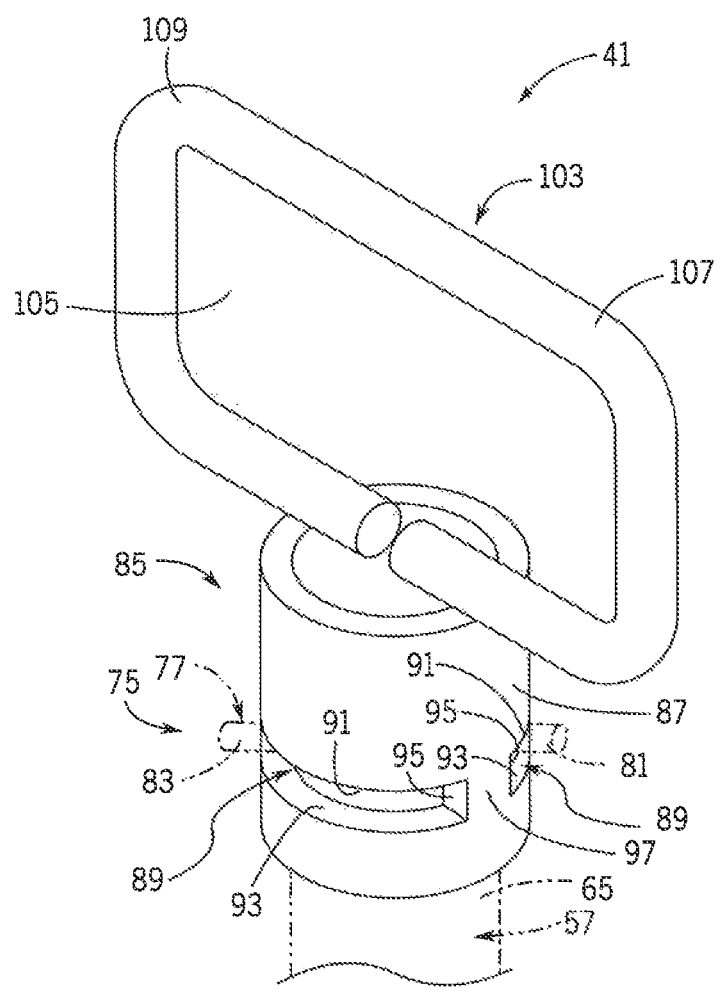
FIG. 5 is an isometric view of the guide of FIG. 3.
Figure 6:
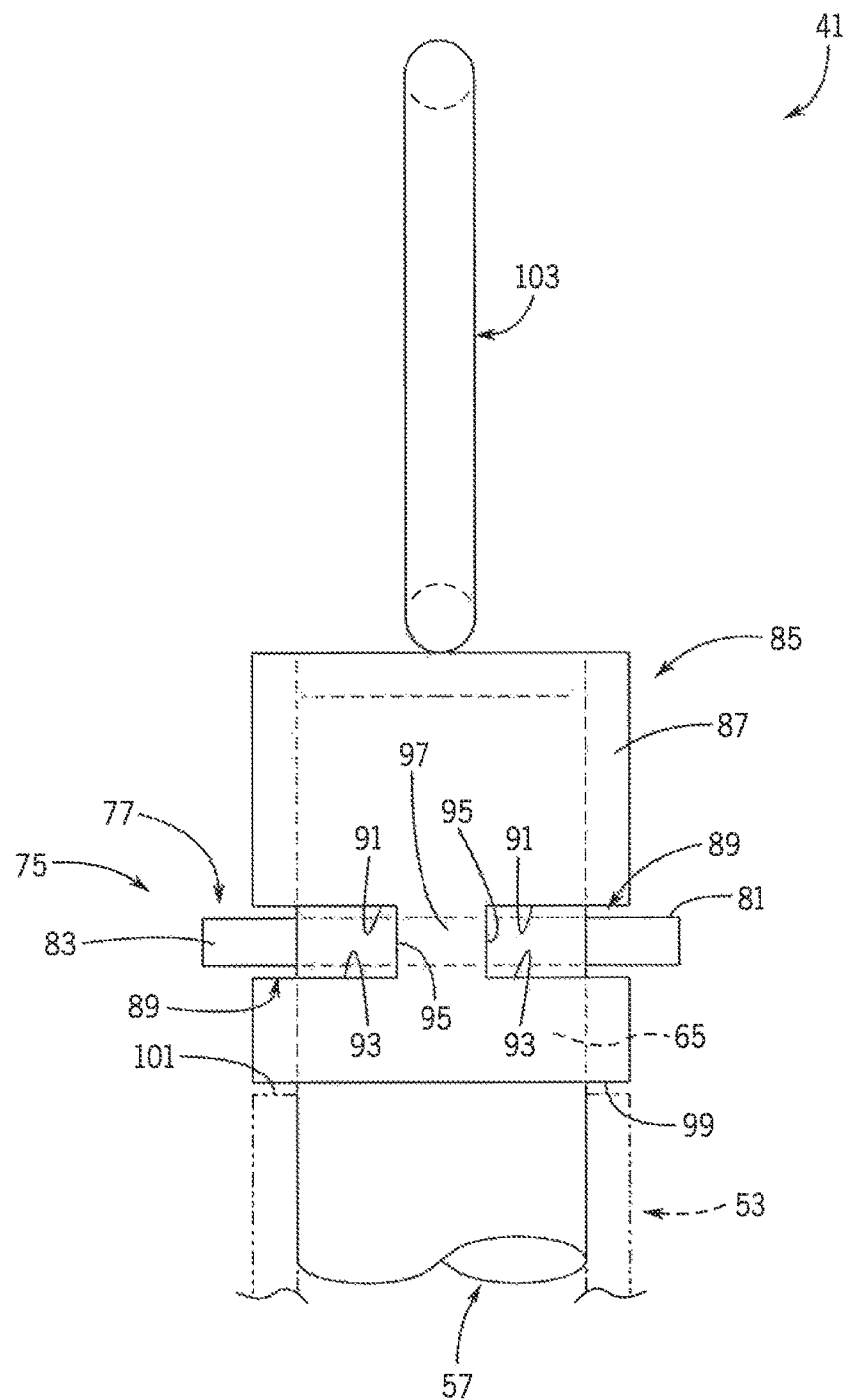
FIG. 6 is a side elevation of the guide of FIG. 3.

Referring now to FIG. 4, a retainer pin 77 extends through bore 79 so as to extend radially through the second portion 65 of the pivot pin 57. Referring now to FIGS. 5 and 6, the retainer pin 77 has first and second ends 81, 83 that extend outwardly beyond an outer circumferential surface of the pivot pin 57 so that each of the first and second ends 81, 83 defines a projection with respect to the pivot pin 57.

Still referring to FIGS. 5 and 6, the guide 41, which is axially restrained by the retainer pin 77, includes a guide collar 85. The guide collar 85 has a circumferential sidewall 87 that is arranged concentrically with respect to the pivot pin 57, shown here as being concentrically outside of the second portion 65 of the pivot pin 57. A pair of slots 89 extends radially through the circumferential sidewall 87 so that the slots 89 are spaced from each other about the circumferential sidewall 87. Each slot 89 is an opening defined between an upper wall 91, a lower wall 93, and a pair of opposing end walls 95. A stop 97 is defined by a continuous web of material of the guide collar 85 between adjacent end walls 95 of the slots 89. Accordingly, another stop 97 is arranged on the opposite side of the guide 41 than what is visible in FIGS. 5 and 6. In another embodiment, the slots 89 do not extend entirely through the circumferential sidewall 87, but instead may extend as elongate grooves into an inner circumferential surface of the circumferential sidewall 87. In yet another embodiment, a single slot 89 is arranged as a spiral along the circumferential sidewall 87 so as to accommodate 180° of rotation or more than 180° of rotation, while translating the guide 41 in an axial direction along the longitudinal axis 59 while rotating.

Still referring to FIGS. 5 and 6, the first and second ends 81, 83 of the retainer pin 77 extend through the slots 89 of the guide collar 85. This arrangement allows the guide 41 to rotate or pivot about the hinge pin 57 while maintaining a substantially constant position along the longitudinal axis 59 (FIGS. 3 and 4) of the hinge pin 57. Engagement of the lower wall 93 and a lower surface of the retainer pin 77 prevents axial withdrawal of the guide 41 from the hinge pin 57. Engagement of the upper wall 91 and an upper surface of the retainer pin 77 prevents axial advancing of the guide 41 along the hinge pin 57, which may also be prevented by an engagement of the lower surface 99 of the guide collar 85 and an upper surface 101 of the bracket collar 53. Since the pivot pin 57 is fixed against rotation within the bracket 42 by way of the engagement of fastener 73 through the bores 69 and 71 of the hinge pin 57 and bracket collar 53, the retainer pin 77 is also fixed against rotation with respect to the bracket 42 (FIG. 4). In this way, the retainer pin 77 restricts movement of the guide 41 to substantially a single degree of freedom, defined as a yaw-type rotation about the longitudinal axis 59 of the pivot pin 57 (FIG. 3), and thus as coaxially aligned with a pivot or rotation axis of the arm 15 relative to the bracket 42 while allowing the guide 41 and the arm 15 to pivot independently of one another. For embodiments in which the slots 89 do not extend entirely through the circumferential sidewall 87, but instead extend as elongate grooves into an inner circumferential surface of the circumferential sidewall 87, spring biased ball bearing detents may project from the hinge pin 57 and into the grooves. Such embodiment may not have any stops 97 and may therefore allow for 360° rotation of the guide 41, as restricted only by the hoses 25 that extent through the guide 41.

Referring now to FIGS. 2 and 5, guide 41 includes a loop 103 defining an opening 105 therethrough and through which the loom 35 of hoses 25 extends (FIG. 2). Shown best in FIG. 5, the loop 103 has first and second segments 107, 109 defining a periphery about the opening 105 so as to define a substantially closed boundary about the loom 35 in this embodiment, although it is understood that the loop 103 may instead have an open configuration while maintaining the loom 35 therein. The cross-sectional area of the opening 105 of the loop 103 is larger than that of the loom 35 and may be substantially larger, for example, at least about two times larger, than the cross-sectional area of the loom 35, allowing the loom 35 to be relatively loosely confined within the loop 103. This may allow the hoses 25 of the loom 35 to gradually bend while being maintained substantially at the articulation point of the arm 15, defined in this embodiment as the hinge joint 19.

Referring now to FIGS. 2 and 3, the system 5 may therefore allow the guide 41 to control direction of movement and position of the hoses 25 in the loom 35 in a passive manner while allowing for free flexing of the loom 35 about an axis of rotation that is common with the axis of rotation of the arm 15 at its intersection with the hinge joint 19 and restricting movement of the loom 35 away from the hinge joint 19. Since parts of the inner and outer segments 37, 39 of the loom 35 are connected to the chassis 13 and arm segment 21, movement of the arm segment 21 with respect to the hinge joint 19 correspondingly flexes the loom 35. As the loom 35 flexes, the flexing of the loom 35 and the engagement between the loom 35 and the loop 103 causes the guide 41 to pivot about the longitudinal axis 59 of the pivot pin 57 as pushed and/or pulled by the flexing loom 35.

Many changes and modifications could be made to the invention without departing from the spirit thereof. The scope of these changes will become apparent from the appended claims.

The invention claimed is:

1. A pivoting hose support system for use with an agricultural implement, the pivot hose support system comprising:
   a first component having a bracket and bracket collar extending therefrom and a movable second component having an arm;
   a pivot pin defining a longitudinal axis and extending through the bracket collar of the first component and the arm of the second component, the pivot pin including:
      first and second opposite ends;
      a first portion for supporting the arm of the second component for allowing the arm to pivot about the longitudinal axis of the pivot pin; and
      a second portion;
   a fastener extending through the pivot pin and the bracket collar for interconnecting the pivot pin to the first component;
   a guide including:
      a guide collar receivable on the first end of the pivot pin and arranged for rotating about the longitudinal axis of the pivot pin, the guide collar including a slot therein lying in a plane generally perpendicular to the longitudinal axis of the pivot pin; and
      a loop extending from the guide collar and defining an opening therethrough for supporting a hose upon the agricultural implement;
   a retainer pin extending through the pivot pin and into the slot in the guide collar, the retainer pin guides rotation of the guide collar with respect to the pivot pin and limits axial movement of the guide relative to the longitudinal axis of the pivot pin.

2. The system of claim 1 wherein the guide collar includes a circumferential sidewall defining the slot therethrough, the retainer pin arranged in the slot for allowing rotation of the guide collar to advance or regress a relative position of the slot with respect to the retainer pin.

3. The system of claim 1 wherein the second portion of the pivot pin is defined adjacent the first end of the pivot pin and wherein the guide extends in an axial direction from the first end of the pivot pin, whereby the opening of the loop is aligned with the longitudinal axis of the pivot pin and is arranged outwardly of the first end of the pivot pin.

4. The system of claim 3 wherein a retainer pin extends transversely through the pivot pin, and wherein the retainer pin has opposing ends projecting radially from opposing sides of the pivot pin.

5. The system of claim 4 wherein the slot is a first slot and wherein the guide collar includes a second slot extending therethrough, each end of the retainer pin arranged within a corresponding slot in the guide collar.

6. The system of claim 5 wherein the guide collar defines a pair of stops between the first and second slots.

7. The system of claim 6 wherein the first and second slots define lengths thereof allowing rotation of the guide collar through a range of motion of at least about 90 degrees.

8. The system of claim 7 wherein the first and second slots define lengths thereof allowing rotation of the guide collar through a range of motion of at least about 180 degrees.

9. A pivoting hose support system for use with an agricultural implement, the pivoting hose support system comprising:
   a first component having a bracket and bracket collar extending therefrom and a movable second component having an arm;
   a pivot pin defining a longitudinal axis and extending through the bracket collar of the first component and the arm of the second component, the pivot pin including:
      first and second opposite ends;
      a first portion for supporting the arm of the second component for allowing the arm to pivot about the longitudinal axis of the pivot pin, and a second portion;
a fastener extending through the pivot pin and the bracket collar for interconnecting the pivot pin to the first component and for preventing rotation of the pivot pin with respect to the first component;
a guide including:
   a guide collar receivable on the first end of the pivot pin and arranged for rotating about the longitudinal axis of the pivot pin, the guide collar including a lower surface engageable with an upper surface of the bracket collar and a slot therein lying in a plane general perpendicular to the longitudinal axis of the pivot pin; and
   a loop extending from the guide collar and defining an opening therethrough for supporting a hose upon the agricultural implement; and
a retainer pin extending through the pivot pin and into the slot in guide collar, the retainer pin guiding rotation of the guide collar with respect to the pivot pin and restrains movement of the guide in an axial direction with respect to the pivot pin.

10. A pivoting hose support system for use with an agricultural implement having a chassis, an arm movable with respect to the chassis, and an actuator arranged for moving the arm with respect to the chassis, the system comprising:
   a bracket interconnected to the chassis and including a bracket collar projecting therefrom;
   a pivot pin defining a longitudinal axis and extending through the bracket collar of the bracket and the arm, the pivot pin including:
      first and second opposite ends;
      a first portion for supporting the arm of the agricultural implement for movement with respect to a chassis of an agricultural implement; and
      a second portion;
   a guide including:
      a guide collar receivable on the first end of the pivot pin and arranged for rotating about the longitudinal axis of the pivot pin, the guide collar including a lower surface engageable with an upper surface of the bracket collar and a slot therein lying in a plane generally perpendicular to the longitudinal axis of the pivot pin; and
      a loop extending from the guide collar and defining an opening therethrough, the loop having a first segment connected to the guide collar and a second segment spaced from the guide collar, the first and second segments of the loop defining a periphery about the opening and wherein a hose extends through the opening such that the guide supports the hose upon the agricultural implement so as to allow the hose to flex transversely with respect to the longitudinal axis of the pivot pin and be restrained against movement in an axial direction relative to the longitudinal axis of the pivot pin; and
   a retainer pin extending through the pivot pin and into the slot in guide collar, the retainer pin guiding rotation of the guide collar with respect to the pivot pin and restrains movement of the guide in an axial direction with respect to the pivot pin.

\* \* \* \* \*